US011348219B2

(12) United States Patent
Andrea (10) Patent No.: US 11,348,219 B2
(45) Date of Patent: May 31, 2022

(54) PROCESS FOR THE AUTOMATIC EVALUATION OF THE QUALITY OF DIGITAL PHOTOGRAPHS

(71) Applicant: PhotoSì S.p.A. Unipersonale, Riccione (IT)

(72) Inventor: Mainetti Andrea, Riccione (IT)

(73) Assignee: PhotoSi S.p.A. Unipersonale, Riccione (IT)

( * ) Notice: Subject to any disclaimer, the term of this patent is extended or adjusted under 35 U.S.C. 154(b) by 0 days.

(21) Appl. No.: 16/978,792

(22) PCT Filed: Feb. 22, 2019

(86) PCT No.: PCT/IB2019/051454
§ 371 (c)(1),
(2) Date: Sep. 8, 2020

(87) PCT Pub. No.: WO2019/171200
PCT Pub. Date: Sep. 12, 2019

(65) Prior Publication Data
US 2021/0042904 A1 Feb. 11, 2021

(30) Foreign Application Priority Data
Mar. 8, 2018 (IT) .................. 102018000003384

(51) Int. Cl.
*G06K 9/00* (2022.01)
*G06T 7/00* (2017.01)
(52) U.S. Cl.
CPC .. *G06T 7/0002* (2013.01); *G06T 2207/30168* (2013.01)

(58) Field of Classification Search
CPC .............. G06T 7/0002; G06T 2207/30168
USPC ........................................................ 382/100
See application file for complete search history.

(56) References Cited

U.S. PATENT DOCUMENTS

| 6,535,636 | B1 | 3/2003 | Savakis et al. | |
|---|---|---|---|---|
| 6,579,239 | B1* | 6/2003 | Avinash | G01S 7/52034 600/443 |
| 8,493,500 | B2* | 7/2013 | Doepke | H04N 5/2351 348/362 |

(Continued)

FOREIGN PATENT DOCUMENTS

| WO | 2006062969 A1 | 6/2006 |
|---|---|---|
| WO | 2016130853 A1 | 8/2016 |

OTHER PUBLICATIONS

Search report for related PCT/IB2019/051454, dated Apr. 17, 2019.

*Primary Examiner* — Jonathan S Lee
(74) *Attorney, Agent, or Firm* — Schott, P.C.

(57) ABSTRACT

A process for the automatic evaluation of the quality of digital photographs includes software programmed to perform the following steps and to perform them through such software:—converting the photograph into greyscale and calculating the intensity diagram of the converted photograph;—identifying a predetermined initial intensity interval and final intensity interval of the diagram;—if in the initial interval and/or the final interval there is a total percentage of pixels of the photograph greater than or "greater than or equal to" a predetermined threshold, the contrast is evaluated;—if the contrast of the photograph converted to greyscale is < or <= a predetermined threshold, the photograph is rejected.

11 Claims, 3 Drawing Sheets

(56) References Cited

U.S. PATENT DOCUMENTS

| | | | | |
|---|---|---|---|---|
| 8,515,171 | B2* | 8/2013 | Vantaram | G06T 7/136 |
| | | | | 382/173 |
| 8,632,011 | B2* | 1/2014 | Gao | G06K 7/1443 |
| | | | | 235/455 |
| 8,724,898 | B2* | 5/2014 | Sambongi | G06T 5/007 |
| | | | | 382/170 |
| 8,760,538 | B2* | 6/2014 | Ross | H04N 5/2352 |
| | | | | 348/229.1 |
| 9,648,251 | B2* | 5/2017 | Pouli | H04N 5/265 |
| 9,691,139 | B2* | 6/2017 | Usman | G06T 5/008 |
| 10,375,317 | B2* | 8/2019 | Chan | G06K 9/6267 |
| 2003/0053690 | A1* | 3/2003 | Trifonov | G06T 5/009 |
| | | | | 382/168 |
| 2006/0171573 | A1* | 8/2006 | Rogers | G06T 7/136 |
| | | | | 382/128 |
| 2006/0204121 | A1* | 9/2006 | Bryll | G06T 7/0004 |
| | | | | 382/255 |
| 2010/0054544 | A1 | 3/2010 | Arguelles | |
| 2010/0086211 | A1* | 4/2010 | Kuehnle | G06T 7/246 |
| | | | | 382/195 |
| 2010/0183225 | A1* | 7/2010 | Vantaram | G06T 7/155 |
| | | | | 382/173 |
| 2013/0076891 | A1* | 3/2013 | Childress | G01N 21/909 |
| | | | | 348/127 |
| 2013/0079626 | A1* | 3/2013 | Shmatukha | A61B 6/5205 |
| | | | | 600/420 |
| 2015/0109337 | A1* | 4/2015 | Hofmann | G06T 19/006 |
| | | | | 345/633 |
| 2019/0053750 | A1* | 2/2019 | Chandrakasan | G06T 7/11 |
| 2020/0409989 | A1* | 12/2020 | Andrea | G06F 16/4393 |

* cited by examiner

PROCESS FOR THE AUTOMATIC EVALUATION OF THE QUALITY OF DIGITAL PHOTOGRAPHS

The present invention relates to a process for the automatic evaluation of the quality of digital photographs.

A digital photograph means a static image converted into digital format and stored on a memory device.

The arrival of digital devices, and the availability for daily and immediate use for anyone, has given each of us the possibility to create an unprecedented number of digital photographs. It is sufficient to think first of the spread of digital cameras, and now of mobile phones and smartphones, which are almost all equipped with cameras, and have become overbearingly a personal and inseparable object, probably destined to identify modern life more than any other.

However, this great power, which is easily available, means that in most cases photographs are taken by chance, without any technique or criterion, often through subsequent and repeated attempts.

Even if this is not the case, it is acknowledged that the final aim for which a photograph is taken is to give it an emotional and evocative value that we wish to keep. This value is inevitably not present in all photographs, either when they are taken by chance, or when they are taken with criterion. Therefore, the subsequent job of evaluating and selecting those with greater value is inherent in the gesture of taking photographs.

The larger the number of photographs taken, the larger the selection job to be performed.

It is now consolidated that from the outset most people do not bother with the evaluation process, hence making the taking of photographs a useless exercise, and leaving so-called "graveyards" of photographs behind them.

In the field of digital devices, and especially smartphones, numerous applications are known that allow photographs to be catalogued, but they are not evaluation systems, rather subdivisions into categories, often of free interpretation.

There is therefore a latent need in the sector for an automatic photograph evaluation and selection process, which performs the rejection of images of lower value in place of the user.

The general object of the present invention is to overcome all or some of the drawbacks of the prior art by providing for the latent need of the sector.

A preferred object of the present invention is that of providing a process that can be easily implemented within a digital device through software.

A further preferred object of the present invention is that of providing a selection process that can easily process a high number of photographs such as, for example, all the photographs present in a digital device like a smartphone or a digital camera, or saved in a predetermined memory environment, such as a hard disk, a SIM card or a private cloud area.

According to a first general aspect, the present invention relates to a process for the automatic evaluation of the quality of digital photographs, characterised by the step of providing software programmed to perform the following steps and to perform them through such software:

accessing an archive of digital photographs containing a plurality of digital photographs;
  converting the photograph into greyscale and calculating the intensity diagram of the converted photograph;
  identifying a predetermined initial intensity interval and final intensity interval of the diagram;
  if in the initial interval and/or the final interval there is a total percentage of pixels of the photograph greater than or "greater than or equal to" a predetermined threshold, the contrast is evaluated;
  if the contrast of the photograph converted to greyscale is < or <= a predetermined threshold, the photograph is rejected.

In this way, it is advantageously possible to automate the recognition of over-exposed or under-exposed photographs and reject them from a selection of photographs created through the process.

Advantageously, through the software it is possible to access an archive of digital photographs and create a group of selected photographs in which those not rejected by the quality evaluation are included.

According to some preferred embodiments the contrast of the photograph converted to greyscale is calculated from all the pixels of the image minus a predetermined quantity of the lighter and/or darker pixels.

In this way, the lighter and darker pixels of the photograph, which could belong to a not very significant and misleading percentage of pixels with respect to the contrast, are rejected from the contrast evaluation. These pixels are conventionally known as "noise".

Preferably, the quantity of pixels rejected from the contrast evaluation is less than a predetermined percentage of total pixels of the image. In this way, the number of pixels to be rejected is proportional to the dimensions of the image.

According to some preferred practical examples the contrast is calculated as follows:

calculating the number of pixels to be rejected by multiplying the predetermined percentage by the total pixels of the photograph;
  following the intensity diagram, removing the darker pixels from the diagram starting from the absolute darkest and proceeding according to the intensity scale of the diagram until reaching the previously calculated number of pixels to reject;
  identifying the intensity of the absolute darkest pixel, according to the intensity scale of the diagram, among the remaining pixels;
  following the intensity diagram, removing the lighter pixels from the diagram starting from the absolute lightest and proceeding according to the intensity scale of the diagram until reaching the previously calculated number of pixels to reject;
  identifying the intensity of the absolute lightest pixel, according to the intensity scale of the diagram, among the remaining pixels;
  calculating the intensity difference between the darkest and lightest pixels identified, which can be performed for example using the unit of measurement of the intensity scale of the diagram.

According to a general preferable characteristic of the invention, it comprises the following process for choosing the best photograph from among similar photographs:

grouping the photographs into similar groups (e.g. based on the comparison of the subject with similarity libraries);
  within each similarity group, calculating a score for each photograph by algebraically summing a plurality of predetermined characteristic values of each photograph,
  choosing the photograph with the highest score and rejecting the others.

Preferably, the characteristic values are selected at least from the following: width of the photograph in pixels, height of the photograph in pixels, ISO sensitivity, focusing value, digital zoom value, analog zoom value, sum of the percentages occupied by the faces if present. The values, according to the type, may for example be extracted from metadata, or calculated using comparison libraries.

A higher score is preferably assigned to the frontal faces and/or with both eyes open and/or a smile if present.

According to a general preferable characteristic of the invention, it comprises the following process for evaluating the weight and/or size of the photograph:
   if the weight in KB is < or <= a predetermined threshold value "and/or" the number of pixels is < or <= a predetermined threshold value, the photograph is rejected.

According to a general preferable characteristic of the invention, it comprises the following process for evaluating the ISO value:
   if the ISO value is outside a predetermined range of values the photograph is rejected.

According to a general preferable characteristic of the invention, it comprises the following process for evaluating the blurring in greyscale:
   the photograph is converted into greyscale
   if the photograph has at least one face: the percentage of area occupied by the rectangles of the faces in the photograph is determined and a blurring limit threshold proportional to the size of the rectangles is established;
   if all the faces have blurring greater than or "greater than or equal to" the limit threshold, the photograph is rejected;
   if the photograph does not have any faces, the overall blurring of the photograph is determined with respect to a predetermined threshold, if the overall blurring is greater than or "greater than or equal to" the predetermined threshold value the photograph is rejected.

The rectangles for example are the smallest rectangles into which a face can be inscribed and/or are determined through a library.

According to some preferred embodiments at least two evaluation criteria are applied from those listed above including that of evaluating the exposure and the contrast, which is applied to the photographs not rejected by the other criterion or other criteria. In general, the contrast/exposure evaluation criteria and/or the blurring criterion and/or the criterion of selecting the best photograph from similar photographs are applied after at least one other evaluation criterion and only to photographs not rejected by such previous criterion.

Preferably, whatever the number and type of criteria adopted, they are applied in succession with each other to evaluate only the photographs not rejected by the criteria previously applied. Preferably, the exposure and contrast evaluation criteria are applied after at least one other criterion.

According to a general characteristic thereof, the invention relates to software programmed to perform a process according to the present invention.

Further characteristics and advantages of the present invention will become clearer from the following detailed description of the preferred embodiments thereof, with reference to the appended drawings and provided by way of indicative and non-limiting example.

Figure 1:
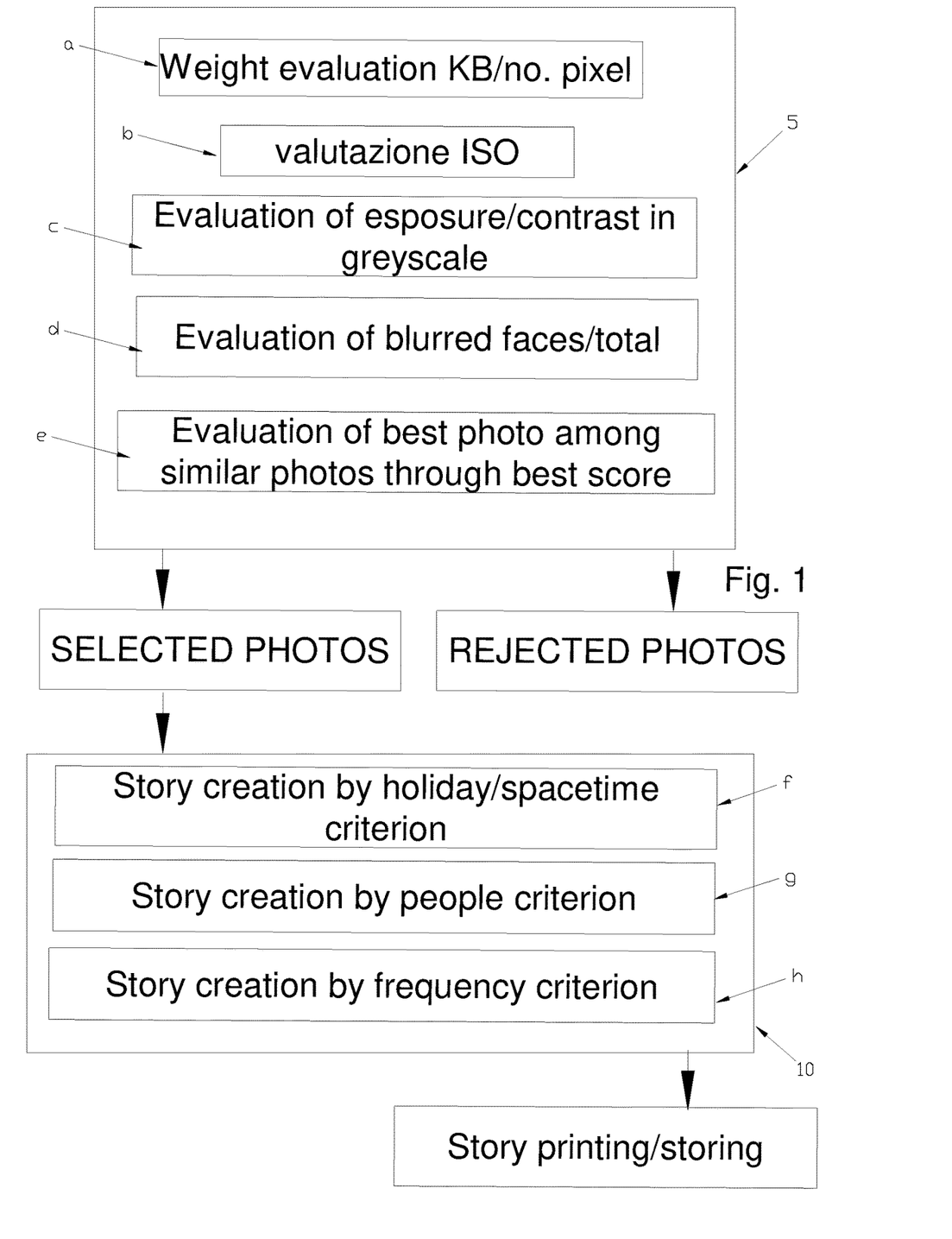
FIG. 1 represents a block diagram of a process implemented by a software application according to the present invention.

With reference to FIG. 1, a process is illustrated, which can be automatically implemented by a software application, to create and print, and/or archive, a story represented by a sequence of digital photographs taken from an archive.

The digital archive is for example the memory of a smartphone, and contains many photographs. Most of them are probably not suitable for printing, therefore the first requirement is to reject the unsuitable ones.

For that purpose, the application accesses the archive and performs the first photograph quality evaluation, indicated overall with reference number 5. The evaluation can be performed, for example, through one or more of the following criteria, in the same sequence illustrated, or in a different sequence:
   a) photograph weight and/or size evaluation criterion: if the weight in KB is < or <= a predetermined threshold value "and/or" the number of pixels is < or <= a predetermined threshold value, the photograph is rejected;
   b) ISO value evaluation criterion: if it is outside a predetermined range of values the photograph is rejected;
   c) exposure and contrast evaluation criterion in greyscale: the photograph is converted into greyscale and the intensity diagram of the photograph converted into greyscale is calculated;
   In general, the greyscale goes from black to white, and it is preferably a standard type scale, e.g. a scale on 256 levels of grey (each level corresponds to an intensity of grey).
   A predetermined initial intensity interval and a final intensity interval of the diagram are identified. These intervals therefore comprise the darkest and lightest grey levels of the scale. The intervals preferably start and finish at the extremes of the diagram.
   If in the initial interval and/or the final interval there is a total percentage of pixels of the photograph greater than or "greater than or equal to" a predetermined threshold, the contrast is evaluated. In fact, these photographs could be overexposed or underexposed, i.e. too light or too dark, but they could also be night-time photographs or photographs in full light exposed correctly, therefore an automatic process is necessary to establish their condition.
   if the contrast of the photograph converted to greyscale is < or <= a predetermined threshold, the photograph is rejected. It is observed that the contrast preferably considered is calculated from all the pixels of the image minus a predetermined quantity of the lighter and/or darker pixels. A contrast calculated as the difference between the intensity of the lighter pixels and the intensity of the darker pixels from among all the pixels could in fact cause an error in which there is a not very significant number of very light or very dark pixels, known as "noise". Rejecting a predetermined quantity of lighter and darker pixels from the evaluation allows the elimination of the noise. In particular, an equal quantity to a predetermined percentage of total pixels of the image are rejected from the contrast evaluation.

Figure 2:
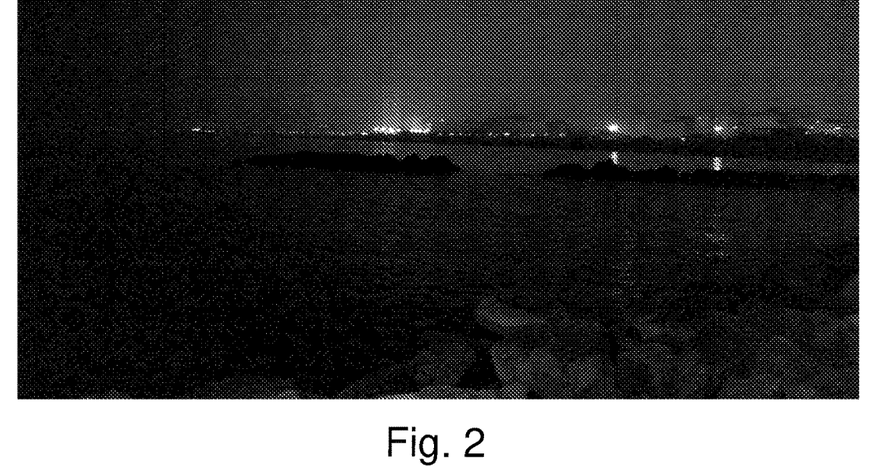
FIG. 2 represents a dark photograph that is rejected by the process according to the invention.
Figure 3:
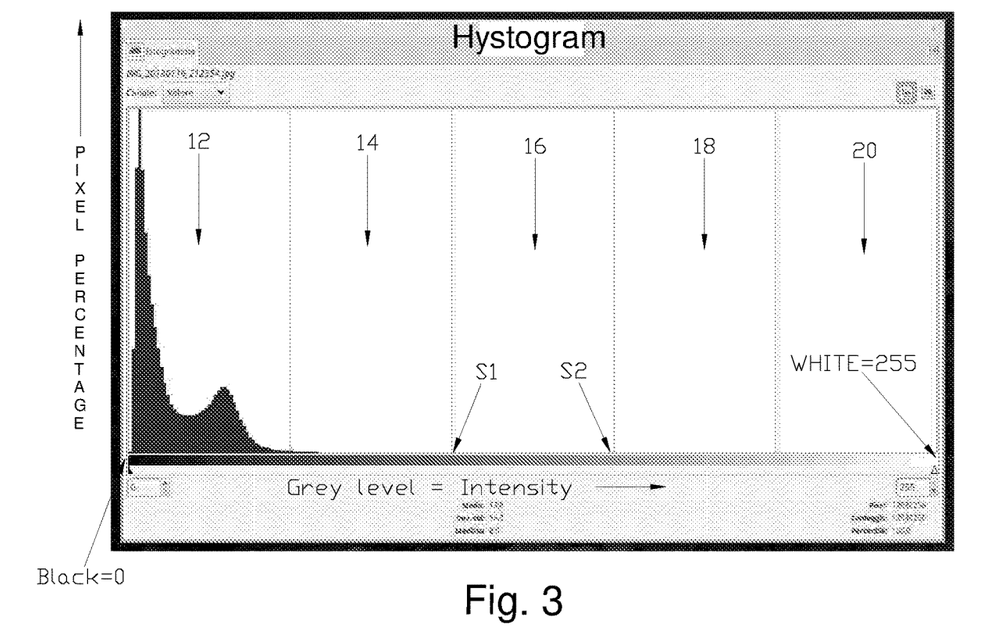
FIG. 3 represents the intensity diagram of the photograph of FIG. 2 converted into greyscale.

With reference to FIGS. 2 and 3, a specific example is provided of the evaluation of a dark photograph that is rejected by the process according to the invention. The photograph is a night-time landscape.

The evaluation starts by converting the image of FIG. 2 into greyscale, where the scale is of the standard type and contains 256 levels of grey.

The evaluation proceeds by calculating, for the photograph converted into greyscale, how many pixels are darker than a predetermined threshold, in particular as a percentage of pixels, of the total pixels of the image, and darker than a predetermined grey threshold level.

This can be done for example by constructing a diagram, preferably in the form of a histogram, of the image in greyscale, represented in FIG. 3.

The diagram shows on the horizontal axis the 256 levels of grey and on the vertical axis the number of pixels (or the percentage of total pixels) present in the photograph for each level of grey.

The levels of the greyscale are split into five intervals of values, indicated by numbers 12, 14, 16, 18, 20, comprised between 0 (black) and 255 (white).

Darker pixels are those that have intensity values that fall within the first two intervals 12 and 14, therefore values comprised between 0 and 101. In other words, the threshold grey level here is the level S1=101 which constitutes the upper limit of the interval 14.

In the example 98.8% of the total pixels of the photograph fall within intervals 12 and 14.

If this interval exceeds a predetermined threshold value it is necessary to proceed to evaluate the contrast of the photograph. For this example we use the following predetermined threshold value: parameter 1=75%, therefore the photograph is potentially underexposed and the evaluation is performed with the following steps.

The image contains both at least one white pixel and at least one black pixel, in particular 8 white pixels and 14072 black pixels, therefore the absolute contrast value would be the difference between the intensity value of the black and of the white, i.e. 255−0=255. However, the perception of the human eye is that the photograph has a decisively lower contrast.

To eliminate the "noise" the contrast of the darker and lighter pixels is removed from the calculation to an extent determined by a predetermined threshold value; in the example we use parameter 2=2%. The image has 12080256 pixels and 2% is equal to 241605 pixels. On one hand, we look in the histogram for the smallest intensity value for which there are at least 241605 darker pixels. In our case this is the intensity value 2, very close to black. Likewise, we look in the histogram for the highest intensity value for which there are at least 241605 lighter pixels. In our case this is the intensity value 42, also a rather dark value. Therefore, the contrast net of the noise, most in line with the contrast perceived by the human eye, is equal to 40. If this value is lower than a predetermined threshold then the photograph is overexposed and is rejected. In the example, we use as the contrast threshold value the parameter 3=125, therefore the photograph in question is rejected.

Figure 4:
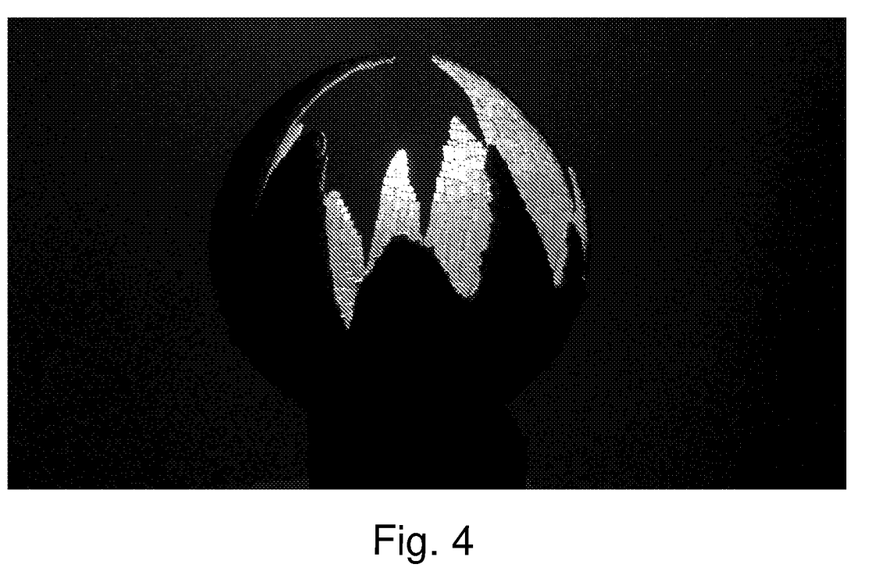
FIG. 4 represents a dark photograph that is selected by the process according to the invention as it has sufficient contrast.

With reference to FIG. 4 a photograph is shown that represents a work of art in a dark environment, illuminated by a source inside the work itself. The photograph has the same dimensions as the previous one.

Figure 5:
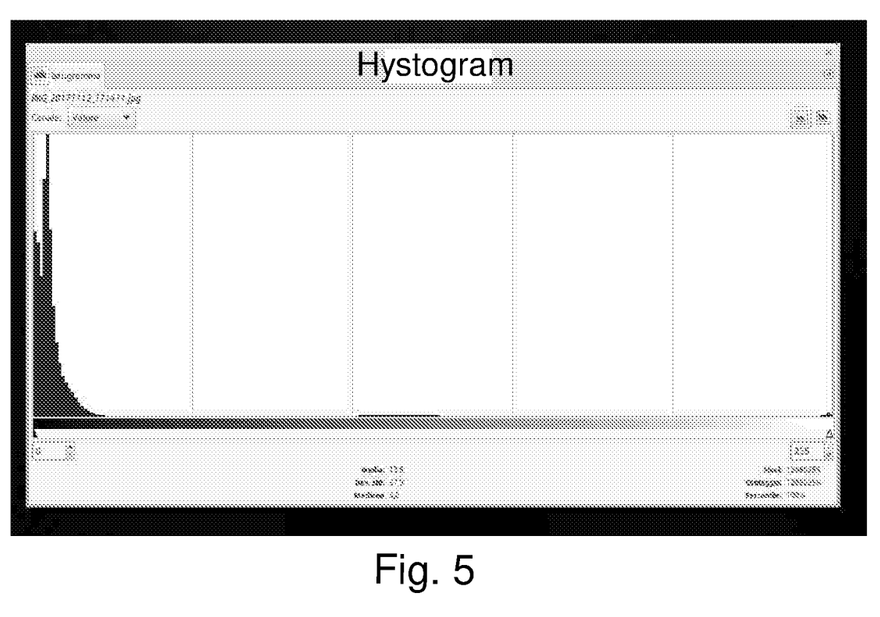
FIG. 5 represents the intensity diagram of photograph 4 converted into greyscale.

By adopting the same process and the same parameters as the photograph of FIG. 2, the histogram of the photograph of FIG. 5 converted into greyscale is obtained.

In particular, 94.8% of the pixels fall within the first two intervals 12 and 14 and therefore the photograph is potentially underexposed.

However, net of the noise determined through parameter 2, the minimum intensity value is equal to 1 while the maximum intensity value is equal to 169 and therefore the perceived contrast, equal to 168, is sufficiently high (>=parameter_3) and the photograph is not rejected.

The same process takes place for potentially overexposed photographs (very light), i.e. those in which the percentage of pixels has an intensity value greater than a predetermined threshold level (>=parameter_1). This percentage is for example the one that falls within the last two intervals (18, 20) therefore the potential overexposure intensity threshold value is the lower end S2=152 of the interval 18.

To summarise in general, in the evaluation we used the following parameters: parameter_1: e.g. 75% (potential underexposure and/or overexposure threshold) parameter_2: e.g. 2% (rejection threshold of pixels that do not fall within the contrast calculation) parameter_3: e.g. 125 (contrast threshold net of noise)

d) blurring evaluation criterion. A preferred criterion is the following:

the photograph is converted into greyscale and an equalisation is preferably performed, e.g. according to a known standard process;

the frontal and profile faces in the photograph converted into greyscale and equalised are detected, using comparison with a library, e.g. the known open-source software "OPENCV". The detections preferably take place both on the image with the original orientation, and on the image rotated according to at least a second orientation, e.g. according to one or more of: rotated left through 90°, rotated right through 90° and rotation through 180°. Both the presence of the eyes (one or both) and the smile are preferably identified.

If the photograph has at least one face: the percentage area occupied by the rectangles of the faces in the photograph is determined. A blurring limit threshold is established, proportional to the size of the rectangles. If all the faces have blurring greater than or "greater than or equal to" their own limit threshold, the image is rejected. The rectangles for example are the smallest rectangles into which a face can be inscribed and/or are determined through a library.

If the photograph does not have any faces, the overall blurring of the photograph is determined with respect to a predetermined threshold, if the overall blurring is greater than or "greater than or equal to" the predetermined threshold value the photograph is rejected.

e) Criterion for the choice of the best photograph from similar photographs. There will almost certainly be photographs present in the archive taken of the same subject in successive attempts, with the intention of having at least one quality photograph. It is therefore necessary to automatically select "only one of these photographs", naturally the best. This can be done as follows.

The application initially groups the photographs into similarity groups (i.e. photographs with a similar subject).

To establish the similarity of the photographs the application preferably compares them using libraries, e.g. using a known algorithm, e.g. an algorithm belonging to the known open-source library OPENCV.

Preferably, a photograph being evaluated is included in a similarity group if it was taken by a device of the same brand and model as the others in the group "and" if it was taken within a time limit predetermined by the last photograph included in the group.

If a photograph cannot be included in a similarity group already created, or if not enough similarity groups exist yet, it is included in a new similarity group.

When there are no more similar photographs to include in a group that comply with the requirement of being taken within the time limit, the group is closed, i.e. no more photographs are included.

Inside each closed similarity group the photograph is selected with the highest quality score, and the others are rejected. The quality score may preferably be calculated for each photograph as follows: for each photograph the application algebraically sums a plurality of predetermined characteristic values thereof, where the values are preferably selected from: width of the photograph in pixels, height of the photograph in pixels, ISO sensitivity, focus value, digital zoom value, analog zoom value, sum of percentages occupied by faces if present (preferably assigning a greater percentage to the frontal faces with both eyes, or with both eyes open, or with a smile). The focus can be calculated e.g. through known libraries. According to simpler embodiments the values are selected from the available metadata only.

Some of these values are obtained from previous evaluations, others are present in the metadata of each photograph. Preferably, the application is able to evaluate the metadata of the most common type, i.e. EXIF type metadata, but it is not excluded that alternative metadata are evaluated such as, for example, XMP or the like.

If the photograph is not rejected by at least one of the previous criteria adopted, it assumes the status of selected photograph and is used in the subsequent story creation algorithm, indicated overall with reference number 10 in FIG. 1.

For example, the photographs not rejected by the quality evaluation 5 are included in a group or in a new archive which the story creation algorithm accesses.

The algorithm can create one or more stories from the photographs selected through one or more criteria. The preferred criteria are as follows.

f) HOLIDAY CRITERION—The main stories to be remembered are statistically those connected to holidays, for which there is a need to create a criterion that identifies them automatically. This can be done for example as follows:
the application is programmed to preliminarily set a reference geolocation, referred to below as the "home" position;
the story is created by grouping to form a story, i.e. a sequence of photographs identified as such, the photographs selected in the previous steps that:
were taken at a spatial distance from the "home" position greater than or "greater than or equal to" a predetermined distance; and
were taken in a time sequence between each other during a timeframe where photographs taken at a distance that is less than or "less than or equal to" the predetermined distance from the "home" position are absent;
A further preferable but not compulsory condition for inclusion in the story may be that of having been taken by the same device; this prevents for example unrelated photographs, such as those coming from social applications like Whatsapp and Facebook or downloaded from the internet, from being included in the story. Additionally or alternatively the software can include the photographs in a same sequence if they have a geolocation that indicates that they were taken within a predetermined spatial distance from at least one photograph already included in said sequence that has in turn a geolocation. This can be performed for example by reading the geolocation of the photographs from the metadata. When the distance criterion is applied in association with the criterion of taking from the same device, it prevents photographs taken from the same device but in very distant places from each other and therefore probably not belonging to the same holiday from being grouped into the same sequence. When, instead, the second criterion is applied without applying the first one, it allows photographs of the same holiday taken in nearby places with different devices to be grouped into the same sequence. The two criteria can be further refined by considering as a further inclusion condition of photographs in the same sequence that of having been taken within a time distance from at least one photograph already included in the sequence less than or equal to a predetermined time.

If the at least one resulting sequence has a number of photographs that is greater than or "greater than or equal to" a minimum predetermined number of photographs, the sequence is definitively identified as a story and the application is preferably adapted to place in order the printing of said sequence of photographs.

Preferably, the application stops adding photographs to the sequence of a story when one of the following conditions occurs:
the sequence has reached a maximum number of photographs allowed by the application; it is not excluded that the maximum number coincides with the minimum number for recognising the sequence as a story.
or the photograph that was taken at later date than the last one included in the sequence was taken at a spatial distance from the "home" position that is less than or "less than or equal to" the threshold value. This "threshold photograph" in particular identifies that the subject returned home, and therefore defines the end of the holiday.
A further preferable condition of interruption of the sequence could be when the timeframe during which the photographs of the sequence were taken has reached a predetermined fixed limit allowed by the application. In the event that the user has only taken photographs away from home, and therefore there is no "threshold photograph" it prevents photographs from different holidays ending up in the sequence.

According to a preferred example, the application starts a new sequence by adding the first photograph, in taking time order, which was taken at a distance greater than or "greater than or equal to" the predetermined distance from the Home position. Subsequently it evaluates the other photographs in order of when they were taken, therefore if the one being evaluated still complies with the spatial distance requirements, and the sequence still has not reached the maximum limit of acceptable photographs, it adds it, otherwise it closes the sequence, i.e. it concludes the story by not adding other photographs.

It could be however that these rules end up interrupting the story in an undesired way, especially at a photographically very intense part, defined by a so-called "shock" of photographs, i.e. a period in which many photographs were taken, in other words a period with a high "taking frequency". This period identifies an interesting part of the story and cannot be truncated, therefore the photographs belonging to a period with a taking frequency that is greater than or "greater than or equal to" a predetermined threshold are included in the sequence even if this goes beyond the allowable photograph limit number.

The recognition of the photographs belonging to a "high taking frequency period" can be performed by comparing the time that passed between the photograph being evaluated and the last photograph included in the sequence, if it is less than or "less than or equal to" a predetermined threshold, the photograph is included in the sequence.

When a story is closed, it is possible to repeat the algorithm to create others, where the subsequent story began by choosing the first photograph from among those not used in the stories previously selected with the same criterion.

g) PEOPLE CRITERION: it is possible to create the personal story of an individual by identifying from all the photographs containing faces, those belonging to the same person. This can be done by comparison with a library, e.g. the open-source library OPENCV.

Preferably, this criterion can include in its sequences also photographs included in sequences created with other criteria, such as the previous criterion.

h) TAKING FREQUENCY CRITERION: Photographs not belonging to the holiday, as they were not taken far from home, but belong to particularly significant events, will almost certainly be included in the archive. It is possible to group them into a story by recognising them based on the taking frequency. In particular, if in a preferably predefined timeframe, there is a number of photographs greater than or "greater than or equal to" a limit threshold "and" taken at a distance from the "home" position less than or "less than or equal to" a threshold value, they are grouped into a sequence that represents a story.

i) GENERAL LIFE CRITERION: all the photographs that were included in the sequence of a story by at least one of the previous criteria that was adopted, preferably the holiday criterion, can be included in a general story sequence, which ends when it reaches a predetermined limit number of photographs or a predetermined timeframe during which the photographs were taken.

According to a preferable general characteristic of the invention, the same photograph can be included in numerous sequences obtained with different criteria, however the opposite, less preferred case, is not excluded, in which the photographs are included in a further type of sequence only, not yet included in another sequence.

According to another preferable general characteristic, it is possible to repeat a same criterion to create more sequences, in which case it is envisaged at least for one or more criteria, such as the criterion for holiday sequences, that the photographs of the new sequences that belong to the same criterion are only included if they have not already been included in another sequence generated with the same criterion. For example, this is feasible by providing that a predetermined criterion for the creation of sequences processes the photographs in a time sequence based on the taking date, therefore a photograph already processed by said criterion may not be processed again according to the same criterion.

According to a further general preferable characteristic of the invention, each type of criterion for the creation of sequences processes all the photographs in a time sequence based on the taking date. This easily allows the same photograph to be included in sequences obtained with different criteria, as each photograph is evaluated by all the criteria.

In general we observe that the invention also envisages the, less preferred, possibility that the story creation algorithm 10 is applicable independently from the quality evaluation 5, and therefore creates stories by selecting the photographs from among all those of the archive, or from those of the archive positively evaluated with a different method from the evaluation 5.

In general, the contrast/exposure evaluation criteria and/or the blurring criterion and/or the criterion of selecting the best photograph from similar photographs are applied after at least one other photograph quality evaluation criterion and only to photographs not rejected by such previous criterion.

In general the application is able to put the printing in order and/or allow the archiving and recovery of all the stories created. The printing is for example put in order by internet connection to a remote printing provider with respect to the device on which the application is installed. The provider is for example a photograph book printing industry.

Although the process has been described herein in the form of a software application installed or installable in a mobile device, such as a smartphone or digital camera, other types of application or software are not excluded. In general, it is further not excluded that the digital archive that the software can access is in an internal memory of the hardware device in which the software is installed such as, for example, a hard disk, and/or an external memory such as, for example, a SIM card, or a cloud environment.

In general, all the solutions deriving from the exchange between the terms greater and "greater than or equal to", and less and "less than or equal to", are contemplated between > and >=, between < and <=. In other words, all the solutions generated by any combination of these terms are contemplated.

In general the greyscale is any quantisation of the intensity of the greys in predetermined grey levels. Grey levels are discrete values spread across a scale. The scale can for example have 256 levels of grey, which can therefore also be called grey intensities.

The grey scale can for example refer to the classical 8-bit binary representation for pixels, which allows 256 levels of grey intensity to be represented, including pure black, generally corresponding to level 0, and pure white, generally corresponding to level 255.

Naturally, the embodiments and variants described and illustrated up to now are for purely exemplifying purposes and a person skilled in the art, to satisfy specific and contingent requirements, can make numerous modifications and variants, including for example the combination of said embodiments and variants, all actually contained within the scope of protection of the present invention as defined by the following claims.

The invention claimed is:

1. Process for the automatic evaluation of the quality of digital photographs, comprising the step of providing software programmed to perform the following steps and to perform them through such software:

converting a digital photograph into greyscale to create a converted photograph and calculating—an intensity diagram of the converted photograph; and identifying a predetermined initial intensity interval and final intensity interval of the intensity diagram;

wherein if in the initial interval and/or the final interval there is a total percentage of pixels of the converted photograph greater than or equal to a predetermined pixel threshold, the contrast is evaluated, otherwise the digital photograph is rejected;

wherein if the contrast of the converted photograph is less than or equal to a predetermined contrast threshold, the digital photograph is rejected.

2. Process according to claim 1, wherein the contrast of the photograph converted to greyscale is calculated from all the pixels of the digital photograph minus a predetermined quantity of the lighter and/or darker pixels.

3. Process according to claim 2, wherein the quantity of pixels rejected from the contrast evaluation is a predetermined percentage of the total pixels of the—digital photograph.

4. Process according to claim 2, wherein the contrast is calculated as follows:
- calculating the number of pixels to be rejected by multiplying the predetermined percentage by the total pixels of the digital photograph;
- following the intensity diagram calculation, removing the darker pixels from the intensity diagram starting from the absolute darkest and proceeding according to the intensity scale of the intensity diagram until reaching the previously calculated number of pixels to reject;
- identifying the intensity of the darkest pixel, according to the intensity scale of the intensity diagram, among the remaining pixels;
- following the intensity diagram, removing the lighter pixels from the intensity diagram starting from the absolute lightest and proceeding according to the intensity scale of the intensity diagram until reaching the previously calculated number of pixels to reject;
- identifying the intensity of the lightest pixel, according to the intensity scale of the intensity diagram, among the remaining pixels;

calculating the intensity difference between the darkest and lightest pixel identified.

5. Process according to claim 1, further comprising at least the following process for selecting a best photograph from among similar photographs:
- grouping photographs into similarity groups;
- within each similarity group, calculating a score for each photograph by algebraically summing a plurality of predetermined characteristic values thereof,
- choosing the best photograph as the photograph with the highest score and rejecting—others.

6. Process according to claim 5, wherein the predetermined characteristic values are selected from a group consisting of: width of—photograph in pixels, height of photograph in pixels, ISO sensitivity, focusing value, digital zoom value, analog zoom value, sum of the percentages occupied by the faces if present.

7. Process according to claim 6, wherein a higher score is assigned to the frontal faces and/or with both eyes and/or a smile if present.

8. Process according to claim 1, wherein the following criterion are used for evaluating a weight and/or size of the digital photograph:
- if the weight in KB is < or <=a predetermined threshold weight value and/or the number of pixels is < or <=a predetermined threshold pixel value, the digital photograph is rejected.

9. Process according to claim 1, wherein the following criterion for evaluating an ISO value of the digital photograph include:
- if the ISO value is outside a predetermined range of ISO values the digital photograph is rejected.

10. Process according to claim 1, further comprising the following criterion for evaluating a blurring in greyscale:
- the digital photograph is converted into greyscale
- if the digital photograph has at least one face: a percentage of area occupied by rectangles of the at least one face in the digital photograph is determined and a blurring limit threshold proportional to a size of the rectangles is established; if all the faces have blurring greater than or greater than or equal to the blurring limit threshold, the digital photograph is rejected;
- if the digital photograph does not have any faces, the blurring of the digital photograph is determined with respect to a predetermined threshold, if the—blurring is greater than or greater than or equal to the predetermined threshold, the digital photograph is rejected.

11. Software programmed to run a process according to claim 1, wherein the software is stored in an internal memory of a hardware device.

* * * * *